C. F. HESS.
MEANS FOR ENCOURAGING AND FACILITATING THE ACCUMULATION OF SAVINGS.
APPLICATION FILED APR. 14, 1908.
933,754.
Patented Sept. 14, 1909.
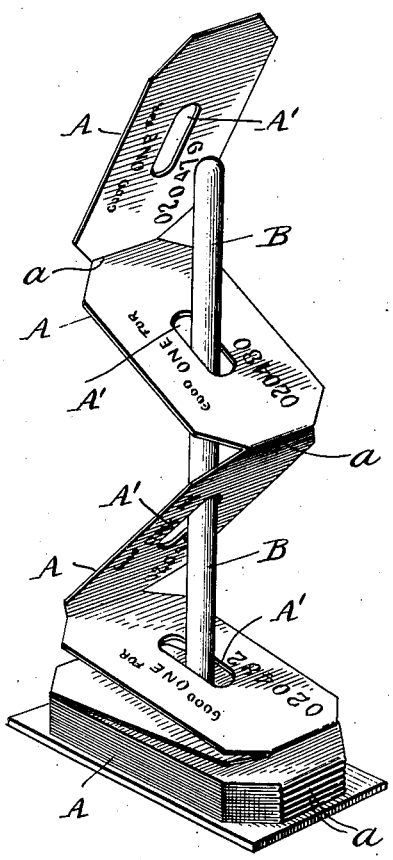
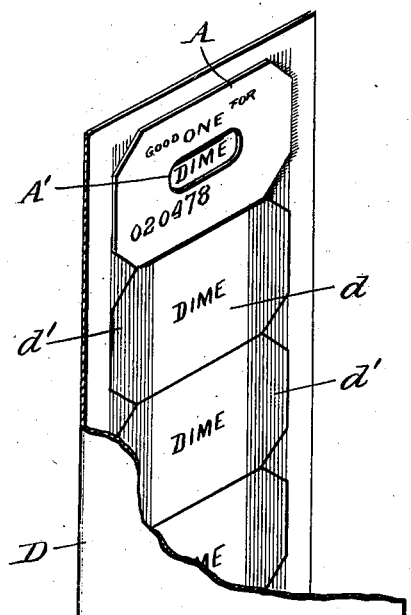
Witnesses
Inventor
Charles F. Hess,
By
his Attorneys,

UNITED STATES PATENT OFFICE.

CHARLES F. HESS, OF SCRANTON, PENNSYLVANIA, ASSIGNOR TO THE BANK SPECIALTY MANUFACTURING COMPANY, OF SCRANTON, PENNSYLVANIA, A CORPORATION OF PENNSYLVANIA.

MEANS FOR ENCOURAGING AND FACILITATING THE ACCUMULATION OF SAVINGS.

933,754.       Specification of Letters Patent.    Patented Sept. 14, 1909.

Application filed April 14, 1908. Serial No. 427,072.

*To all whom it may concern:*

Be it known that I, CHARLES F. HESS, a citizen of the United States, residing at Scranton, in the county of Lackawanna and State of Pennsylvania, have invented certain new and useful Improvements in Means for Encouraging and Facilitating the Accumulation of Savings; and I do hereby declare the following to be a full, clear, and exact description of the same, reference being had to the accompanying drawings, forming a part of this specification, and to the letters of reference marked thereon.

The present invention relates to a means for extending the field of operations of savings bank institutions by providing a convenient and safe means whereby credit for fractional amounts may be secured without requiring the depositor to visit the bank with each fractional amount set aside for deposit.

The objects of the invention are not only to reduce the labor and expense of the banking institution, but to facilitate and encourage the accumulation of savings by small increments and to remove all temptation to spend small coins or amounts of cash when in the possession of the depositor, thereby enabling a depositor to accumulate a sufficient amount to be accepted by the bank for credit on its books.

In the practical operation of a system in which the subject matter of the present application is made use of, the banking institution locates at places convenient for the depositors, coin deposit receptacles which will automatically, or through manipulation by the depositor, deliver a coupon or insignia for the fractional sum deposited in the receptacle. This coupon or insignia is meaningless and of no value separately, but when pasted or secured upon a card or book issued by the banking institution to and properly identifying the depositor, it indicates with the data on the card or book, the amount which will be credited to the account of the depositor when the book and attached coupons are presented to the bank by the depositor to whom the card or book was issued.

In the accompanying drawings: Figure 1 is a view of a strip of coupons such as are adapted to be delivered singly from a receptacle or deposit receiver upon the deposit therein of coins of predetermined value, the folded strip being mounted on a suitable holder. Fig. 2 is a view, partly broken away, of a card or book adapted to receive the coupons and in combination with which they indicate the amount which will be credited to the account of the depositor, one coupon being shown pasted in its proper place on the card or book.

The mechanical devices constituting the coupon delivering and coin deposit box form no part of the present invention, and hence description of the same is unnecessary, but it is preferred that the coupons should be delivered from a holder which will preserve the coupon strip compactly folded and in such condition that strips may be secured together, one after another to avoid any break in the continuity of the strips or any break in the consecutive arrangement of the coupons.

The coupons A are prepared in the form of strips, each coupon being connected with the adjacent coupons along severing and folding lines *a* usually notched or otherwise weakened to facilitate severance and folding. Each coupon is formed with a central opening A', preferably elongated or of oval shape, and all of the openings are adapted to register when the strip is folded back and forth as shown in Fig. 1, whereby the folded strip may be filed on a holder consisting of a standard or filing wire B. The strip will open out freely as it is drawn off the holder, and the coupons must be detached in successive order, but at the same time the compact folded body of the strip may be removed from the holder and its final coupon secured to the first coupon of a new strip, and the whole returned to the holder, ready for detachment of the coupons in succession.

The card or book D, which is furnished to the depositor by the bank, has at some suitable point a space for the name and address, or other proper identification of the depositor, and in addition it is provided with marked spaces *d* for the reception of the coupons. As a convenient means for securing the coupons in place lines of adhesive or gum *d'* are provided on the card or book, thus by wetting the back of the coupons and pressing them against the adhesive they will be securely attached.

The coupons are consecutively numbered and each bears upon its face a portion only of a value indication, the remaining portion of the value indication being on the card or book, thus the coupon and book must be brought together in proper relation in order to indicate the value or amount which the bank will credit to the account of the depositor.

As shown, each coupon bears upon its face at C the words "Good for one" such words being just above and in proximity to the central opening and in each space on the card intended for the reception of the coupons is the word "Dime"—when the coupons are mounted on the card the word dime is displayed through the central opening and in connection with the partial value indication on the coupon indicates the value of each coupon when affixed to the card and presented to the bank by the properly identified depositor.

Obviously, instead of employing automatic coupon and coin deposit boxes, persons detailed by the bank for the purpose, may detach the coupons from the folded strips and deliver the same to depositors in exchange for cash, the coupons and card or book thus becoming the evidence of the deposit of fractional amounts with the subagents of the banking institution. An illustration of this use of the invention would be when a school teacher is authorized to take fractional deposits from the scholars and to give coupons in exchange therefor, but in the practical working of the systems it is preferred to relieve individuals of the responsibility, and to deliver the coupons from a suitable automatic deposit and coupon delivering apparatus.

Having thus described my invention, what I claim as new and desire to secure by Letters Patent, is:—

1. The combination with a depositor's book having a series of indications printed thereon, each indication being a duplicate of the others and each being part of a value indication, of coupons, each coupon having an aperture therethrough and a part of a value indication printed thereon in proximity to the aperture, said aperture being of such shape as to expose the indication on the book when the coupon is pasted in the book and the indications on the coupon and book when the two are brought together forming a complete value indication.

2. A connected strip of separable coupons, each coupon being provided with an elongated aperture located centrally of the coupon, the strip being folded back and forth on the lines between the coupons to form a compact pile with the elongated apertures registering with each other, said coupons being consecutively numbered and having indications printed thereon in proximity to the apertures each indication being a duplicate of the others and each being part of a value indication.

CHARLES F. HESS.

Witnesses:
K. H. BECK,
STANLEY S. HILLS.